(12) United States Patent
Le Clerc

(10) Patent No.: US 6,307,888 B1
(45) Date of Patent: Oct. 23, 2001

(54) METHOD FOR ESTIMATING THE NOISE LEVEL IN A VIDEO SEQUENCE

(75) Inventor: François Le Clerc, Rennes (FR)

(73) Assignee: Thomson Licensing S.A, Boulogne Cedex (FR)

( * ) Notice: Subject to any disclaimer, the term of this patent is extended or adjusted under 35 U.S.C. 154(b) by 0 days.

(21) Appl. No.: 09/266,323

(22) Filed: Mar. 11, 1999

(30) Foreign Application Priority Data

Apr. 14, 1998 (EP) .................................................. 98400917

(51) Int. Cl.[7] ....................................................... H04N 7/12
(52) U.S. Cl. ................ 375/240.29; 375/240.16; 375/240.27; 348/607; 348/620; 382/275
(58) Field of Search .................. 375/240.16, 240.24, 375/240.26, 240.27, 240.29; 348/699, 618, 619, 620, 607; 382/275; 358/463

(56) References Cited

U.S. PATENT DOCUMENTS

| | | | |
|---|---|---|---|
| 4,807,034 | * 2/1989 | Takeuchi et al. | 348/620 |
| 5,161,018 | * 11/1992 | Matsunaga | 348/620 |
| 5,442,407 | * 8/1995 | Iu | 348/620 |
| 5,500,685 | * 3/1996 | Kokaram | 348/620 |
| 5,548,659 | * 8/1996 | Okamoto | 382/107 |
| 5,600,731 | * 2/1997 | Sezan et al. | 382/107 |
| 5,610,729 | * 3/1997 | Nakajima | 358/463 |
| 6,069,670 | * 5/2000 | Borer | 348/620 |

FOREIGN PATENT DOCUMENTS

| | | | |
|---|---|---|---|
| 562407A1 | 9/1993 | (EP) | H04N/17/00 |
| 735 747 A1 | 10/1996 | (EP) | H04N/5/44 |
| 735747A1 | 10/1996 | (EP) | H04N/5/44 |

OTHER PUBLICATIONS

Boyce, J.M., "Noise reducing of image sequences using adaptive motion compensated frame averaging", IEEE ICASSP–92, vol. 3, No. 5, Mar. 1992, pp. 461–464.*

Kleihorst et al, "Noise reduction of image sequences using motion compensation and signal decomposition", IEEE Transaction on Image Processing, vol. 4, Iss. No. 3, Mar. 1995, pp. 274–284.*

Pickering et al., "An adaptive search length algorithm for block matching motion estimation", IEEE Trans. on Circuits and Systems for Video Technology, vol. 7, Iss. No. 6, Dec. 1997, pp. 906–912.*

Sungook Kim and C.C. Jay Kuo, *Fast Motion Vector Estimation with a Markov Model for MPEG*, Feb. 7, 1995, SPIE (Digital Video Compression: Algorithms and Technologies 1995), p. 210–221, San Jose (US) XP002110480.

* cited by examiner

*Primary Examiner*—Vu Le
(74) *Attorney, Agent, or Firm*—Joseph S. Tripoli; Ronald H. Kurdyla; Guy H. Eriksen

(57) ABSTRACT

In noise measurement for video sequences it is difficult to distinguish between picture content and noise. In order to improve the measurement reliability the results of two different noise level computing methods are combined. One computation relies on the analysis of displaced field or frame differences, the other is based on the values of the field or frame differences over static picture areas.

14 Claims, 2 Drawing Sheets

METHOD FOR ESTIMATING THE NOISE LEVEL IN A VIDEO SEQUENCE

FIELD OF THE INVENTION

The invention relates to a method for estimating the noise level in a video sequence.

BACKGROUND OF THE INVENTION

EP-A-0735747 discloses a method of noise measurement in conjunction with a block-matching motion estimation algorithm, the principle of which is to derive a noise level from the minimum of accumulated absolute pixel difference values, leading to a displaced field or frame differences (DFD) value, the accumulation taking place over predetermined pixel blocks.

A paper by Q. Zhang and R. Ward, entitled "Automatic assessment of signal-to-thermal noise ratio of television images", Vol. 41, No. 1, IEEE Transactions on Consumer Electronics (February 1995), discloses a method for measuring the noise level from the TV pictures as such. This method is based on the application of a two-dimensional highpass filter on the images in order to remove the majority of the (non-noisy) image content. Thereafter the smoothest regions of the picture, i.e. those having minimum energy with respect to brightness variations, are selected and the noise power is estimated from their remaining average power.

That paper says that in digital image processing the customary procedure to estimate the level of thermal noise in the image is to analyse "smooth regions, i.e. regions containing constant luminance (grey levels)".

SUMMARY OF THE INVENTION

The method described in EP-A-0735747 lacks robustness because it is based solely on the minimum of the distribution of estimates for each block of the picture, and therefore depends on the shape and deviation of this distribution. The method described by Zhang et al. suffers from the same shortcoming, as the computation of the noise level is eventually based on the low-end tail of the distribution of noise energies over subimages of a picture. Thus, for pictures with few areas of high spatial frequencies, there is a risk of under-estimating the noise level.

The proposed method alleviates this problem by biasing the estimation largely on averages, rather than minima, of noise energy measurements. The measurement performed over static areas, in particular, is independent of the spatial frequency contents of the picture.

It is one object of the invention to disclose a method for more reliable noise estimation.

In the invention, additional motion information provided by e.g. a motion-compensated interpolation is used in order to compute a more robust and accurate estimation of the noise level in a video sequence. Ideally, if motion estimation is error-free, the remaining differences between the grey levels of input pixels from the two source picture blocks put in correspondence by an estimated motion vector must be the result of noise.

The additional motion information may also be derived from motion vector information of an MPEG bitstream.

Modifying the field or frame rate of a video sequence by interpolating pictures located temporally between the source pictures is required for picture rate upconversion or standards conversion. The best conversion quality is achieved if the motion of objects in the source sequence is estimated and used to interpolate each pixel along the direction of its associated motion vector. Another application of this technique is noise reduction by means of a temporal filter, with the goal of improving either the picture quality or the coding efficiency, e.g. of MPEG2 encoders. Motion estimation can be performed by finding the vectors that provide the best match between pixels or blocks of pixels mapped from a previous or current picture to a next picture. The mathematical criterion used for the selection of a motion vector is usually the minimisation of the sum of the absolute values of the displaced field difference or displaced frame difference of a pixel block, as described in FIG. 1. An intermediate field or frame IF to be interpolated is located temporally between a previous field or frame PF and a next field or frame NF.

The temporal distance between PF and NF is T, between PF and IF $\alpha*T$, and between IF and NF $(1-\alpha)*T$. The zero vector $0=(0,0)$ passes through points $I^P(x,y)$ in PF, $I(x,y)$ in IF, and $I^n(x,y)$ in NF. A current candidate motion vector $v=(v_x, v_y)$ passes through points $I^P(x-\alpha*v_x, y-\alpha*v_y)$ in PF, $I(x,y)$ in IF, and $I^n(x+(1-\alpha)*v_x, y+(1-\alpha)*v_y)$ in NF.

The frame difference (for vector 0) is $FD=I^n(x,y)-I^P(x,y)$.

The displaced frame difference for vector v is $DFD(v)=I^n(x+(1-\alpha)*v_x, y+(1-\alpha)*v_y)-I^P(x-\alpha*v_x, y-\alpha*v_y)$.

The interpolation of the output pictures is carried out along the direction of the estimated motion vectors. The quality of the interpolation is limited by the accuracy of the motion vectors, except in static parts of the pictures where the motion is known to be exactly zero. It is therefore advantageous to detect static areas in the source images and to implement a specific interpolation mode for moving pixels, thereby optimising the interpolation output resolution. A specific solution for detecting such static areas is disclosed in another application of the applicant, internal reference PF980013, filed at the same date.

The inventive noise level estimation, however, is based on source pictures only. Therefore, if FIG. 1 is applied to the noise level estimation, intermediate field or frame IF is that current source picture for which the noise level is to be estimated.

According to the invention, the results of two different noise level computing methods can be combined in order to improve the reliability of the noise level estimation. One computation relies on the analysis of DFDs, the other is based on the values of the field or frame differences (FD) over static areas.

The availability of an accurate estimate of the noise level potentially improves the performance of many image processing algorithms in the presence of noise because it allows to adapt the algorithm parameters and thresholds to that noise level. Applications include: motion estimation, noise reduction, detection of static areas, film mode and film phase detection, detection of cuts, and many others.

In principle, the inventive method is suited for estimating the noise level for a current source field or frame of a video sequence, based on the differences between pixel values of blocks in a previous field or frame and corresponding pixel values of corresponding blocks in a future field or frame, wherein either said previous or said future field or frame can be said current field or frame itself, and wherein at least one block of each corresponding couple of blocks is a motion-compensated pixel block or is mapped to the other block by an associated motion vector estimate. In addition, static picture areas can be determined and the differences between pixel values of blocks in a static picture area of a previous field or frame and corresponding pixel values of corresponding blocks in a future field or frame can be used to estimate a further noise level estimate which is then combined with said noise level estimate in order to form a final noise level estimate, wherein said previous and/or said future field or frame used for the evaluation of said differences between pixel values of a block in a static picture area can be different from said previous and/or said future field or frame used for the evaluation of the differences concerning said motion-compensated pixel blocks or said mapped blocks.

BRIEF DESCRIPTION OF THE DRAWINGS

Embodiments of the invention are described with reference to the accompanying drawings, which show in.

DETAILED DESCRIPTION OF PREFERRED EMBODIMENTS

Input data to the inventive noise level estimation (in one field or frame hereafter referred to as the current field or frame) include:

a map of displaced field or frame differences which may be a by-product of a motion estimation;

a map of the input pixels or blocks of pixels which have been detected as being non-moving;

a map of field or frame differences, computed between a previous frame and a next frame, located in time respectively before and after the current frame, if the source images are progressive ones, or in case of interlaced source images computed between a previous field and a next field located in time respectively before and after the current field, with the constraint that said previous and next fields have the same parity, i.e. that both are top fields or both are bottom fields, in both alternatives the previous field or frame or the next field or frame may be the current field or frame;

the estimate for the noise level derived for a previous source field or frame.

Figure 1:
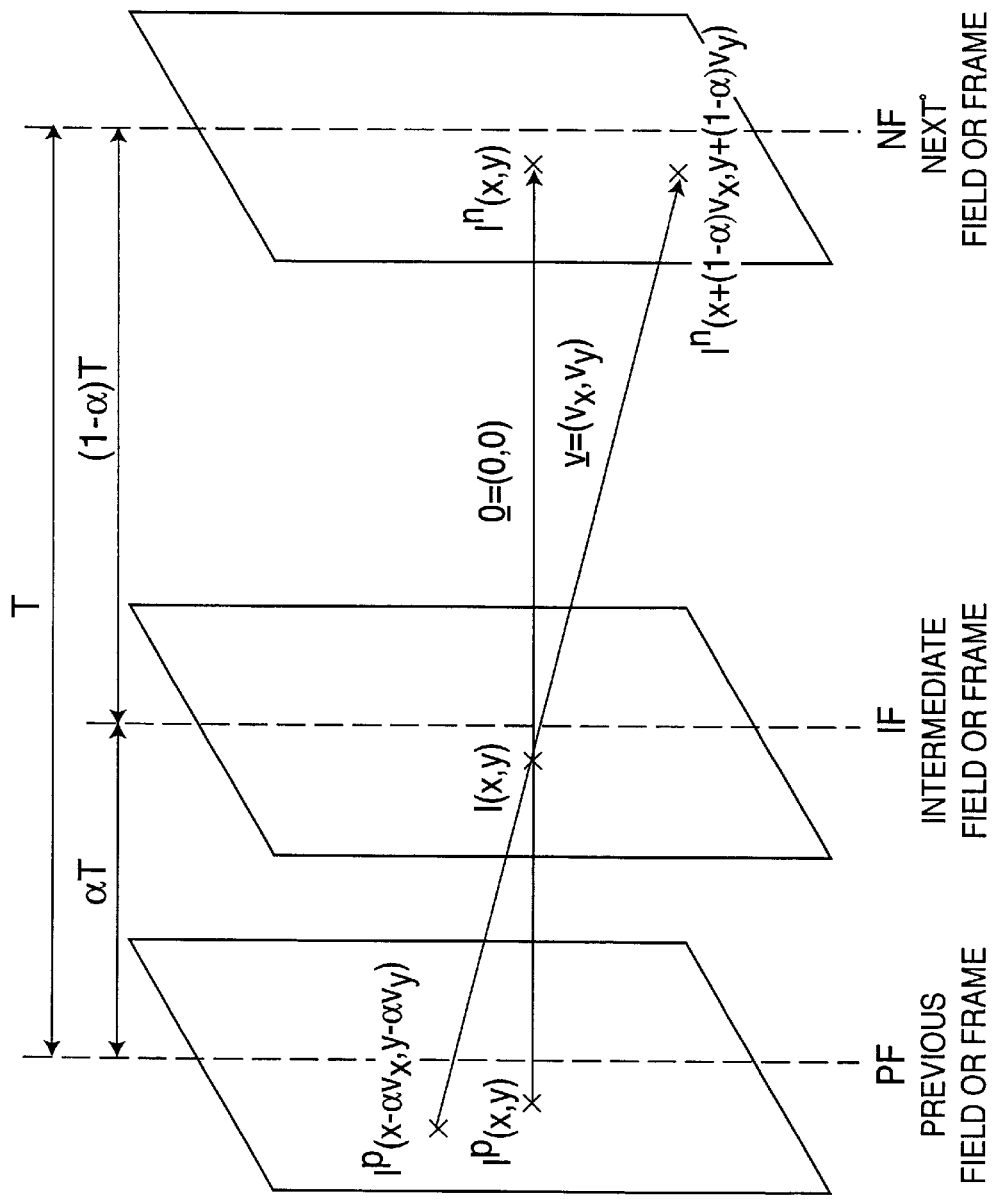
FIG. 1 picture to be interpolated between and from a previous source picture and a next source picture, or, current source picture, between a previous source picture and a next source picture, for which the noise level is to be estimated.
Figure 2:
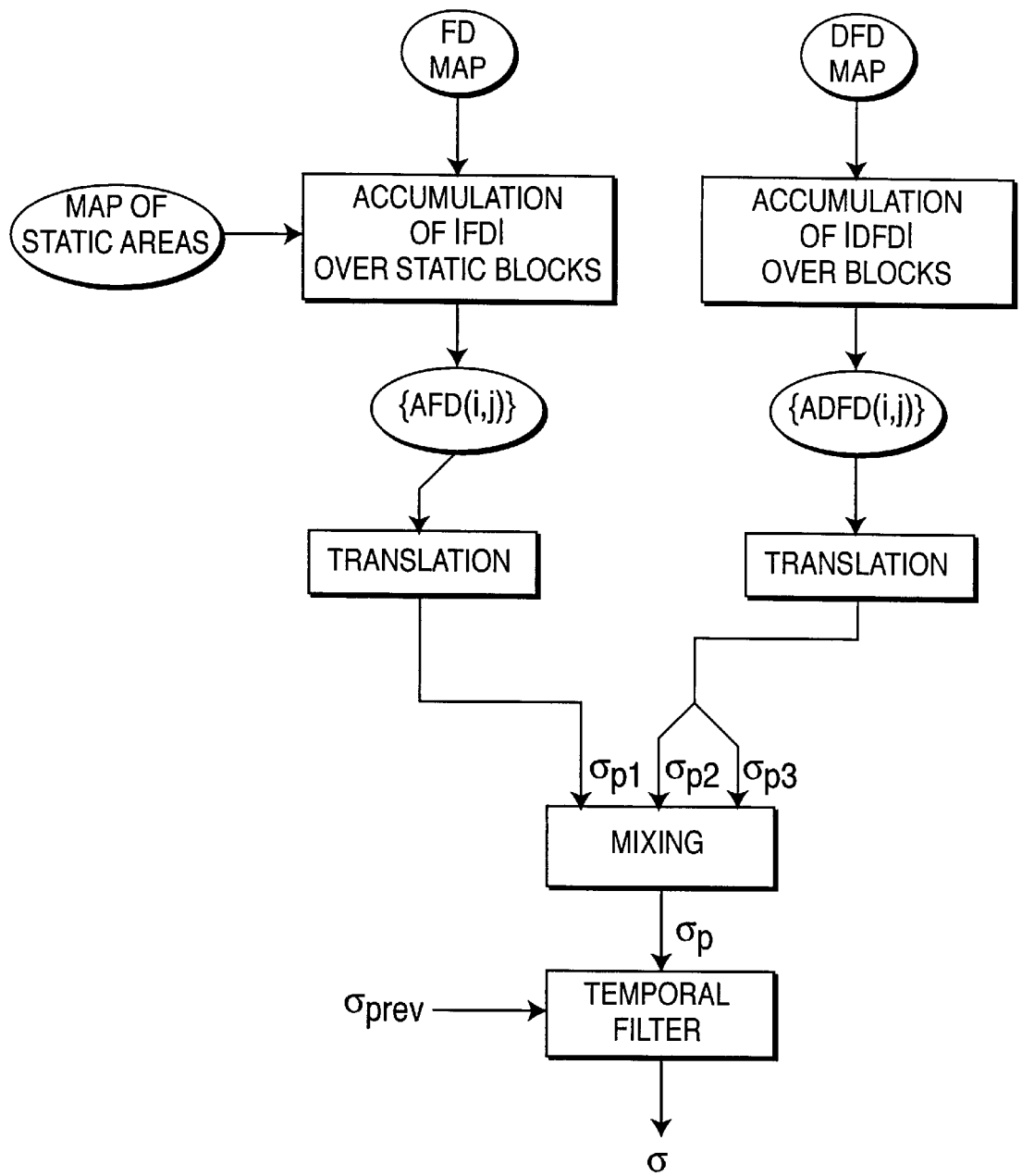
FIG. 2 flow chart for the inventive noise level computation.

The computation includes the following steps (cf. FIG. 2):

a) dividing the current source field or frame into a predetermined raster of FD blocks and integrating the absolute values of the FDs over only those FD blocks which are made up exclusively of pixels classified as static in the map of static areas;

b) translating the resulting block FDs into a first preliminary estimate of the standard deviation of the noise according to a predetermined noise model;

c) dividing the current field or frame into a predetermined raster of DFD blocks and integrating the absolute values of the DFDs over these blocks;

d) translating the resulting block DFDs into a second and a third preliminary estimate of the standard deviation of the noise according to a predetermined noise model;

e) computing a fourth preliminary estimate of the current noise level as a function of the first three preliminary estimates;

f) filtering this fourth preliminary estimate using the final noise level estimate computed for a previous field or frame to provide the final noise level estimate for the current field or frame.

A noise model assigns to a detected distribution of amounts of pixel differences in a block a corresponding noise level.

Ideally, if motion estimation is error-free, the remaining differences between the grey levels of input pixels from the two source picture blocks corresponding to, or mapped by, a motion vector must be the result of noise. The statistical distribution of the DFDs thus provides an advantageous starting point for the noise level estimation.

In practical systems, however, the accuracy of motion estimation is limited by such factors as the finite coding accuracy of the vector components, the finite spatial resolution of the source pictures, deviation of the actual scene motion from the assumed motion direction model which is usually a translative motion, and unavoidable estimation errors due to motion analysis failure, e.g. in objects containing periodic structures or in covered/uncovered areas or in pixel blocks containing a static area and smaller moving objects. The resulting motion estimation inaccuracies translate into residual DFD terms which add to the noise contribution, and thus bias the estimation of the real noise level.

Perfect motion estimation, i.e. with infinite accuracy, is nevertheless achievable on non-moving parts of the input sequence, provided that such areas exist in the current picture, which is not the case e.g. during camera panning, and that a secure method, which may or may not use motion vector information, of detecting these areas is implemented. Indeed, motion vector components in static areas are exactly zero. As a result, non-displaced frame differences or field differences between interlaced fields of identical parity, when computed on a static picture area, provide samples of pixel-wise interframe noise signal differences which are unspoiled by any residual terms stemming from motion estimation inaccuracies.

Advantageously, in the invention these two procedures are combined: one based on DFDs and the other based on FDs over static picture areas.

In situations, e.g. of camera pannings, where all picture pixels are in motion and therefore no noise level estimate can be derived from the FDs, advantageously a fallback scheme can be implemented. For example, it can be decided in these cases to base the estimation solely on DFD information, or to retain the estimate computed for the previous field or frame.

In step a) the absolute values of the FD samples are integrated over predetermined pixel blocks in the current field or frame, hereafter referred to as FD blocks FDB (i,j), which may or may not be overlapping. Only the FD blocks which are made up exclusively of pixels classified as non-moving in the map of static areas are used in the estimation process. For each of these FD blocks an accumulated frame difference AFD (i,j) is computed as the sum of the absolute values of the FDs associated to the pixels making up the block.

It is the purpose of step b) to derive a first preliminary estimate $\sigma_{p1}$ of the standard deviation of noise, expressed in grey levels, from the set of {AFD (i,j)}. This computation can be adapted to an a priori noise model. In one embodiment of the invention it is assumed that the distribution of the absolute values of the FDs associated with static pixels is such that its mean $m_{|FD|}$ is proportional to the standard deviation $\sigma$ of the noise level to be estimated: $m_{|FD|} = k^* \sigma$.

This assumption holds in particular when the samples of the source noise are spatially and temporally uncorrelated and follow a Gaussian distribution, in which case k is found to equal $2/\sqrt{(\pi)}=1.13$. In one embodiment of the invention, k is set to this value. The mathematical expectancy of the AFDs, which can be approximated by the arithmetic average $\{AFD(i,j)\}$ of the AFD(i,j) over the static blocks within the current field or frame, is given by $N_{FDB}* m_{|FD|}$, where $N_{FDB}$ represents the number of pixels in an FD block.

A good approximation to a can therefore be derived as:

$$\sigma_{p1}=\{AFD(i,j)\}/(k*N_{FDB})$$

In step c), which is similar to step a), the absolute values of the DFD samples are integrated over predetermined blocks in the current field or frame, hereafter referred to as DFD blocks DFDB(i,j). These blocks may or may not be overlapping. For each DFD block DFDB(i,j) an accumulated DFD referred to as $\{ADFD(i,j)\}$ is computed as the sum of the absolute values of the DFDs associated to the pixels making up the block.

In step d), which is similar to step b), the set of $\{ADFD(i,j)\}$ is translated into a second $\sigma_{p2}$ and a third $\sigma_{p3}$ preliminary estimate of the standard noise deviation expressed in grey levels. The derivation of $\sigma_{p2}$ is identical to that of $\sigma_{p1}$ with the exception that the set of $\{AFD(i,j)\}$ is replaced by the set of $\{ADFD(i,j)\}$. Let $N_{DFDB}$ be the number of pixels in a DFD block and $\{ADFD(i,j)\}$ be the average of the ADFDs for the current field or frame. Then $\sigma_{p2}$ is computed as:

$$\sigma_{p2}=\{ADFD(i,j)\}/(k*N_{DFDB})$$

Unlike for FDs, however, the estimation of noise level based on DFDs may be biased by residual terms resulting from motion estimation imperfections as explained above. This is likely to occur if the processed fields or frames contain areas with high spatial gradients. In order to improve the robustness of the proposed method, a third preliminary estimate $\sigma_{p3}$ is derived from the minimum rather than the average of the ADFD(i,j):

$$\sigma_{p3}=\min(ADFD(i,j))/(k*N_{DFDB}))i,j$$

In step e) a single preliminary estimate $\sigma_p$ is derived from $\sigma_{p1}$, $\sigma_{p2}$ and $\sigma_3$. First, the ratio $r=\sigma_{p2}/\sigma_{p3}$ is thresholded to determine which preliminary estimates should be used.

A value of r above a predetermined threshold $T_r$ set to a value in the range between "1" and "5", preferably to the value "2" in one embodiment of the invention, indicates a large variety of textures and therefore a significant proportion of high gradient areas in the source picture. In that case $\sigma_{p2}$ is deemed to be unreliable and the preliminary estimate $\sigma_p$ is computed from $\sigma_{p1}$ and $\sigma_{p3}$ only.

Conversely, if r falls to or below $T_r$, indicating consistency of the estimates computed from the block DFDs, $\sigma_{p2}$ and $\sigma_{p3}$ as well as $\sigma_{p1}$ are used.

Advantageously $\sigma_p$ is derived as:

$$\sigma_p = (\sigma_{p1} + \sigma_{p3})/2 \quad \text{if } \sigma_{p2}/\sigma_{p3} > T_r$$

$$\sigma_p = \text{median}(\sigma_{p1}, (\sigma_{p1} + \sigma_{p2})/2, \sigma_{p3}) \quad \text{if } \sigma_{p2}/\sigma_{p3} \leq T_r$$

where median( ) means a 3-tap median filter.

Since fast variations of the actual noise level in a broadcast image sequence are very unlikely, in step f) a temporal low-pass filter is applied to cp to further improve the robustness of the noise level estimation. The final estimate a of the standard deviation of the noise level is computed from $\sigma_p$ and from the noise level estimate $\sigma_{prev}$ of a previous frame or field or field of corresponding parity as:

$$\sigma=\text{median}(\sigma_{prev}-\Delta v_{low}, \sigma_p, \sigma_{prev}+\Delta v_{high})$$

$\Delta v_{low}$ and $\Delta v_{high}$ are predetermined constants that specify the maximum variations of the estimated noise level variance from one estimation cycle (e.g. field or frame) to the next. In one embodiment of the invention $\Delta v_{low}$ and $\Delta v_{high}$ are set to about "1" and about "0.25" grey levels, respectively. The threshold values given in this application are based on an 8-bit representation of the pixel values. If these pixel values have a different resolution, the threshold values should be adapted accordingly.

It may happen that motion estimation is performed on couples of fields or frames that are not consecutive, in which case the current source picture for which the noise level is estimated may differ from the pictures used for motion estimation. This is the case e.g. in an MPEG2 encoding scheme if the current frame is a B-frame.

One or both of said fields or frames used for determining the pixel value differences FD concerning static picture areas can be different from one or both of said fields or frames used for determining the pixel value differences DFD concerning couples of motion-compensated blocks or couples of blocks mapped by their associated motion vector.

One may use all blocks of the active part of the fields or frames concerned for the noise level computation. However, it is also possible to not consider pixel blocks which are located at the borders of the active picture part, in particular because the motion information for such blocks may be less reliable. It is also possible to limit further the number of blocks considered per picture.

What is claimed is:

1. Method for estimating the noise level for a current source field or frame of a video sequence, including the following step:
   calculating differences between pixel values of blocks in a previous field or frame and corresponding pixel values of corresponding blocks in a future field or frame, wherein either said previous or said future field or frame can be said current field or frame itself and wherein at least one block of each corresponding couple of blocks
   is a motion-compensated pixel block or
   is mapped to the other block by an associated motion vector estimate; and
   translating the detected distribution of pixel difference values of a block into a noise level estimate using a predetermined noise model.

2. Method according to claim 1, including the further steps:
   determining static picture areas;
   determining the differences between pixel values of blocks in a static picture area of a previous field or frame and corresponding pixel values of corresponding blocks in a future field or frame;
   calculating therefrom a further noise level estimate using a predetermined noise model;
   combining said further noise level estimate with said noise level estimate in order to form a final noise level estimate, wherein said previous and/or said future field or frame used for the evaluation of said differences between pixel values of a block in a static picture area can be different from said previous and/or said future field or frame used for the evaluation of the differences concerning said motion-compensated pixel blocks or said mapped blocks.

3. Method according to claim 2, wherein the amount values of said pixel difference values become accumulated for each block.

4. Method according to claim 2, wherein said blocks are overlapping.

5. Method according to claim 2, wherein for said noise level estimate two estimates are calculated, wherein the first one is derived from the average of the accumulated block pixel difference values for the current field or frame and wherein the second one is derived from the minimum of the accumulated block pixel difference values for the current field or frame.

6. Method according to claim 1, wherein the amount values of said pixel difference values become accumulated for each block.

7. Method according to claim 1, wherein said blocks are overlapping.

8. Method according to claim 1, wherein for said noise level estimate two estimates are calculated, wherein the first one is derived from the average of the accumulated block pixel difference values for the current field or frame and wherein the second one is derived from the minimum of the accumulated block pixel difference values for the current field or frame.

9. Method according to claim 8, wherein the final noise level estimate is the mean of said further noise level estimate and the second one of said noise level estimates, if the ratio between the first one and the second one of said noise level estimates is greater than a predetermined threshold, in particular about "2", and wherein the final noise level estimate is the median of said further noise level estimate and of the mean of this further noise level estimate and the first one of said noise level estimates and of said second one of said noise level estimates, if the ratio between the first one and the second one of said noise level estimates is equal to or smaller than said predetermined threshold.

10. Method according to claim 9, wherein said final noise level estimate becomes median filtered together with a noise level estimate for a previous frame or field from which a first predetermined constant is subtracted and with said noise level estimate for a previous frame or field to which a second predetermined constant is added, in order to form a final output noise level estimate.

11. Method according to claim 10, wherein said first and second predetermined constants specify the maximum variations of the estimated noise level variance from one estimation cycle to the next.

12. Method according to claim 10, wherein said first predetermined constant has a value of about "1".

13. Method according to claim 10, wherein said second predetermined constant has a value of about "0.25".

14. Method according to claim 1, wherein in situations where all or nearly all pixels of a picture are in motion, a fallback noise level estimation is carried out and that estimation is based solely on the determination of pixel value differences concerning motion-compensated interpolated pixel blocks or blocks mapped by an associated motion vector estimate, or is based on a noise level estimate computed for a previous field or frame.

* * * * *